United States Patent

Yost

[11] B 3,925,208

[45] Dec. 9, 1975

[54] AEROBIC SEWAGE TREATMENT SYSTEM

[75] Inventor: Kenneth J. Yost, Eaton, Ohio

[73] Assignee: Coate Burial Vault, Inc., West Milton, Ohio

[22] Filed: Mar. 13, 1973

[21] Appl. No.: 340,833

[44] Published under the Trial Voluntary Protest Program on January 28, 1975 as document no. B 340,833.

[52] U.S. Cl. ............... 210/199; 210/205; 210/220; 210/320
[51] Int. Cl.² .......................................... C02C 5/04
[58] Field of Search ....... 210/14, 15, 195, 220, 221, 210/320, 63, 199, 205; 261/119 R, 125

[56] References Cited
UNITED STATES PATENTS

| | | | |
|---|---|---|---|
| 1,734,011 | 10/1929 | Harrison | 210/15 X |
| 3,054,602 | 9/1962 | Proudman | 210/15 X |
| 3,116,912 | 1/1964 | Finsberg | 210/195 X |
| 3,133,878 | 5/1964 | Kober | 210/220 |
| 3,148,948 | 9/1964 | Lutz | 261/119 R |
| 3,462,360 | 8/1969 | McKinney | 210/195 X |
| 3,547,812 | 12/1970 | McWhirter | 210/15 X |
| 3,547,813 | 12/1970 | Robinson et al. | 210/15 X |
| 3,624,696 | 11/1971 | Cohen et al. | 261/119 R |

*Primary Examiner*—Thomas G. Wyse
*Assistant Examiner*—Robert H. Spitzer
*Attorney, Agent, or Firm*—Jacox & Meckstroth

[57] ABSTRACT

Water containing organic solid material is directed into one end of a shallow rectangular tank having a cover and a series of internal walls defining a series of longitudinally disposed treating chambers. The water is maintained within each chamber at a level slightly below the cover, and low pressure air is continuously injected from an air supply pump into each chamber to produce circulation of the water around a baffle member projecting downwardly from the cover and to cause diffusion of the air into the water for dissolving the solid material. Air supply and exhaust passages for each chamber are formed within the cover, and air is also directed in series through the chambers. The purest water within each chamber at the water surface, is directed into the water within the adjacent chamber below the surface to provide a series of successive aerobic treatments which result in producing a progressively purer water and a clear discharge effluent having a high percentage of dissolved oxygen.

4 Claims, 3 Drawing Figures

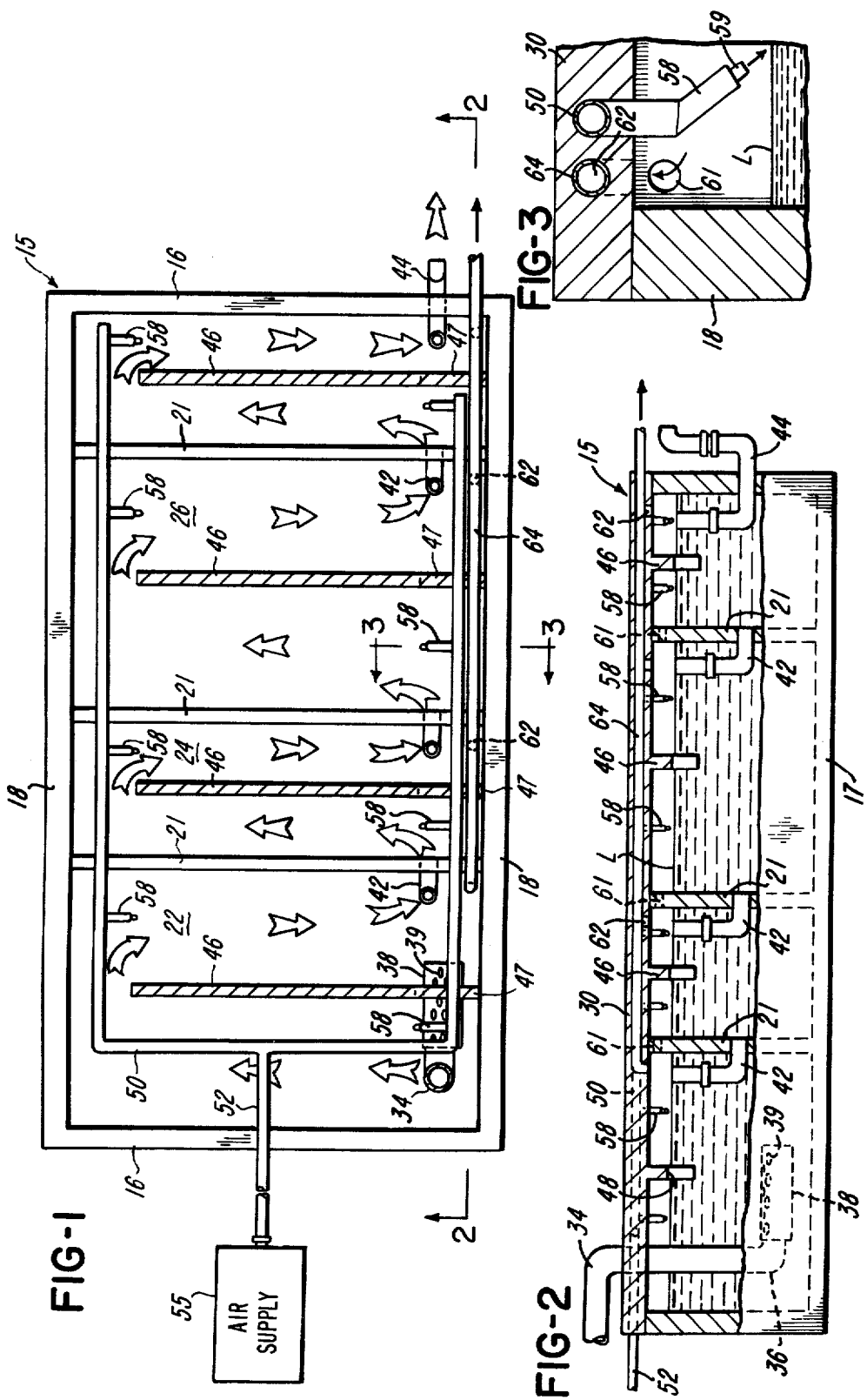

AEROBIC SEWAGE TREATMENT SYSTEM

BACKGROUND OF THE INVENTION

In the art of aerobic sewage treatment systems which are primarily intended for use in conjunction with a single family residence or a small apartment or office building, it is common to direct the sewage into a tank chamber wherein a motor driven aerator mechanism is submerged for introducing air into the lower portion of the sewage or water within the tank. For example, U.S. Pats. No. 2,852,140, No. 2,889,047 and No. 2,987,186 each disclose such an aerobic digestion system. Usually, the tanks include an anaerobic trash chamber which is located on one side of the aeration chamber and initially receives the sewage, such as shown in U.S. Pat. No. 2,852,140. A clarifier chamber is located on the other side of the aeration chamber and from this chamber, the treated water is discharged from the tank. The agitation and aeration of the water within the aeration chamber and the rising of the air bubbles, result in vertical circulation of the water and usually produces substantial noise. Sometimes the motor driven air pump is submerged within the tank as shown in U.S. Pat. No. 2,852,140 to reduce the noise level.

It has also been proposed to locate the air supply pump remotely from the aerobic digestor tank and to supply air from the pump through a flexible tube to a diffuser pipe or duct located within the lower portion of the tank. For example, U.S. Pat. No. 3,627,135 shows the release of air bubbles from small openings or holes within a diffuser manifold located within the lower portion of the digestor tank. However, frequently the small openings within a submerged diffuser pipe or duct, will become clogged by the collection of foreign particles or a build-up of undissolvable material on the tube or duct around the holes. Such clogging decreases the operating efficiency of the sewage treatment system and requires that the air diffuser tube or duct be periodically removed for cleaning. Since the tanks are usually installed within the ground below the ground surface, this cleaning operation normally requires that an access riser or duct be provided for the tank to eliminate the requirement of removing the overlying layer of earth each time the diffuser duct is removed for servicing and cleaning. A similar access duct is also required for those aerobic digestion systems which employ a submerged motor-driven impeller such as disclosed in above U.S. Pat. No. 2,852,140 and No. 2,987,186.

In view of the fact that it is highly desirable to minimize the maintenance required for operating an aerobic sewage digestion system, and especially those which are used with single family residences or small buildings where there is no maintenance engineer, it is desirable to eliminate the requirement of submerging any operating component within the liquid sewage.

SUMMARY OF THE INVENTION

The present invention is directed to an improved aerobic sewage treatment system of the general form disclosed in copending application Ser. No. 241,128 filed Apr. 5, 1972 now issued as U.S. Pat. No. 3,817,858 and which is assigned to the assignee of the present invention. The improved system incorporates a simplified tank structure and an improved treating method which increases aerobic digestion of the solid material within the sewage so that the discharge effluent is substantially pure and has a high dissolved oxygen content. The sewage treatment system of the invention also minimizes maintenance by eliminating from the tank any component which requires cleaning or servicing and by eliminating the use of a timer mechanism which is usually required to actuate a motor driven agitator within the tank. Furthermore, the sewage treatment system substantially eliminates vertical circulation of the liquid sewage within the tank so that the liquid is permitted to stratify during the aerobic digestion process and thereby provide for progessively purifying the water within the tank.

The above features and advantages and other features, which will be apparent from the following detailed description of the invention, are provided in the illustrated embodiment of the invention wherein a rectangular tank has a length and width substantially greater that its depth and includes a series of laterally extending intermediate walls defining a series of longitudinally disposed treating chambers which are enclosed by a lid or cover. The sewage is introduced into one of the end chambers, and the purest liquid or water within the upper portion of each chamber is transferred to the intermediate portion of the water within the next successive chamber.

A small air space is defined between the surface of the water within each chamber and the underneath surface of the tank cover, and low pressure streams of air are introduced into the air space of each chamber to produce slow circulation of the liquid within the chamber around a center baffle member which projects downwardly from the cover. The air streams introduced into each chamber are also directed to cause injection or diffusion of the air into the water, resulting in absorption of the oxygen within the water to provide the aerobic digestion of the solid organic particles suspended within the water. The air is supplied into each of the treating chambers in a series-parallel arrangement, and air supply and exhaust passages are formed within the cover of the tank.

BRIEF DESCRIPTION OF THE DRAWINGS

FIG. 1 is a plan view of an aerobic sewage treatment tank constructed in accordance with the invention and with the tank cover broken away from the air supply and exhaust conduits;

FIG. 2 is an elevational view of the tank shown in FIG. 1 and with a portion shown in section taken generally on the line 2—2 of FIG. 1; and FIG. 3 is a fragmentary section taken generally on the line 3—3 of FIG. 1.

DESCRIPTION OF THE PREFERRED EMBODIMENT

The aerobic sewage treatment system shown in FIGS. 1-3, incorporates an elongated rectangular tank 15 which is formed of cast concrete and includes opposite end walls 16 integrally connected by a bottom wall 17 and opposite side walls 18. The tank 15 also includes a set of integrally cast intermediate walls 21 which cooperate with the walls 16–18 to define an initial or trash aeration chamber 22, a set of intermediate aeration chambers 24 and 26 and a final aeration clarifier chamber 28. A generally flat top wall or cover 30 seats on the walls 16, 18 and 21 and is sealed by a suitable sealing compound (not shown) so that each of the treating chambers is substantially fluid-tight.

The tank 15 has a length and a width which are substantially greater than its height. For example, in one test system which provided highly satisfactory results in the treatment of sewage from a single family residence, the tank 15 had a length of approximately 13 feet, a width of approximately 7 feet and a height or depth of approximately 2 and ½ feet, providing a capacity of about 1,400 gallons. The sewage, which is hereinafter referred to as water, is supplied to the tank 15 through an inlet pipe or conduit 34. The conduit 34 extends downwardly through an opening within the cover 30 and terminates within the lower portion of the aeration chamber 22 with a 90° elbow 36. An elongated baffle 38 having an inverted U-shaped cross-sectional configuration, is secured to the elbow 36 and has a series of longitudinally spaced slots or openings 39 within its top portion to provide for gradual escape of any gas bubbles within the incoming water. For example, the openings 39 provide for the slow release of gas bubbles which developed within the foam of a detergent was solution discharged from an automatic clothes washer.

The water is maintained at a level L within each of the treatment chambers 22, 24, 26 and 28 by a series of L-shaped overflow pipes 42 which extend through the middle portions of the corresponding intermediate walls 21. The water in the clarifier chamber 28 is discharged from the tank 15 through a generally U-shaped discharge pipe 44 which also serves as a trap to prevent air from discharging with the water.

A series of baffle elements or members 46 are cast as an integral part of the concrete cover 30 and project downwardly into the corresponding treating chambers 22, 24, 26 and 28 parallel to the end walls 16 and intermediate walls 21 of the tank. Each of the baffle members 46 includes a major longitudinal portion which projects downwardly several inches below the level L of the water within the tank. Each baffle member 46 also includes an end portion 47 having a bottom surface 48 which is slightly above the water level L.

As shown in FIG. 1, a generally U-shaped air supply manifold or line 50 consisting of a plastic tubing, is embedded within the lid or cover 30. The line 50 is connected by a conduit or line 52 to an air supply blower or pump 55 which provides a relatively low volume, low pressure air supply to the line 50. For example, in the embodiment referred to above and which provided superior test results, the air pump 55 consisted of a one-third horsepower motor driving an air pump which has a capacity of approximately 14 c.f.m. to atmosphere. The restriction to the air flow within the lines 50 and 52 and within the tank 15, reduced the air flow to about 10 c.f.m.

A series of air injection tubes 58 (FIG. 3) project downwardly from the air supply line 50 through the bottom of the cover 30 and into generally diagonally opposed corners of each of the treating chambers 22, 24, 26 and 28. Each of the air discharge pipes 58 includes a reduced nozzle portion 59 which is preferably inclined inwardly at an angle of between 15° and 45° relative to a vertical reference plane. By arranging the air injection tubes 58 on opposite sides of the baffle member 46 within each of the treating chambers, the air jets or concentrated streams discharged from the nozzle portions 59, create positive but relatively slow circulation of the water within each treating chamber in a clockwise direction (FIG. 1) around the corresponding baffle member 48.

Air is also successively directed through the treating chambers as a result of a series of passages 61 which are formed within the intermediate walls 21 and progressively increase in diameter for directing air in series through the chambers. In addition, a portion of the air is exhausted from each of the treating chambers through a corresponding exhaust port 62 (FIG. 2) which is formed within the cover 30 above the corresponding water transfer pipe 42. The ports 62 connect with an air exhaust manifold or line 64 which is also imbedded within the cover 30 and extends parallel to one side of the air supply line 50.

The sewage treatment system shown in FIG. 1–3 operates in the following manner. As the sewage or water enters the initial trash aeration chamber 22, the air injected through the corresponding tubes 58, produces a constant gentle circulation of the water. In addition, the air is injected into the surface of the water to produce aerobic digestion of the organic solid material within the water. The air supply streams are sufficiently light to avoid turbulence within the water so that the water has an opportunity to stratify with the purest water located at the top of the chamber. This water is discharged from the trash aeration chamber 22 into the first intermediate aeration chamber 24 at a level where the water has generally a corresponding degree of purity.

The water within the chamber 24 is exposed to the same injection of air streams through the corresponding air injection tube 58 so that the water circulates, and the purest water within the top of the chamber 24 flows through the corresponding pipe 42 into the adjacent or second aeration chamber 26. As a result of the air injection and aeration of the water within the chamber 26, the water is further purified, and the purest water within the chamber 26 is directed into a lower portion of the water within the clarifier or final aeration chamber 28. In this chamber 28, the water receives the final injection of air, and the water or effluent which is discharged from the chamber 28 through the outlet line 44, is substantially free of suspended organic particles. In addition, the discharged water has a high dissolved oxygen content. For example, in the test referred to above where the sewage from an average single family residence was treated, the dissolved oxygen ranged between 5 and 11 parts per million, which is substantially higher than the dissolved oxygen of 2 to 3 p.p.m. within the normal discharge effluent from a conventional aerobic digestion of the type disclosed in the above patents.

Thus as the water is successively transferred from the initial aeration chamber 22 through the intermediate aeration chambers 18 and 24 to the final aeration chamber 28, the water is progressively purified so that the effluent or water discharged from the tank is significantly purer and has a high dissolved oxygen content. As mentioned above, the introduction of the air streams into each of the treating chambers is not only effective to produce a slow horizontal circulation of the water around the corresponding baffle member 46, but is also effective to inject the air into the water so that the air is absorbed into molecular solution.

While only two diagonally located air injection tubes 58 are shown within each of the treating chambers, it is to be understood that additional air injection tubes may be used if it is desired to increase the circulation of the water within the chamber and/or the penetration or diffusion of air into the water within each treating chamber. The circulation of the water within each treating chamber as a result of the continuously supplied low pressure air streams, provides for diffusion of air into the water but eliminates any significant turbulence of the water so that the water is permitted to stratify within each chamber with the purity of the water increasing towards the top of each chamber. Furthermore, by using an air supply pump 55 having a low pressure output and by operating the pump continuously, the maintenance and the noise level of the pump is minimized. The air supply pump 55 is also adapted to be located remotely from the tank 15, for example, within a nearby utility building or garage. The discharge of the air into the air spaces above the water level L also reduces the power required by the pump 55 in comparison with the discharge of air through a submerged diffuser pipe against a hydraulic head.

While the form of sewage treatment system herein described constitutes a preferred embodiment of the invention, it is to be understood that the invention is not limited to the precise system described, and that changes may be made therein without departing from the scope and spirit of the invention as defined in the appended claims.

The invention having now been described, the following is claimed:

1. In apparatus for treating a liquid containing organic solid material, comprising a tank having side and bottom walls defining a treating chamber, a removable cover member mounted on said tank for enclosing said chamber, inlet means for directing the liquid into said chamber, and outlet means for limiting the liquid within said chamber at a level below said cover member to define an air space within said chamber between said cover member and the surface of the liquid, the improvement comprising a plurality of air nozzles supported by said cover member and positioned above the surface of the liquid, means for supplying air to said nozzles for producing corresponding streams of air from said nozzles against the surface of the liquid tó cause surface diffusion of the air into the liquid and aerobic digestion of the organic solid material within the liquid, each of said nozzles being positioned on an incline relative to said cover member and the surface of the liquid, means for producing slow and continuous horizontal circulation of the liquid within said chamber in a generally circular path and including an arrangement of said nozzles spaced along said path and inclined in the same direction relative to the circulation of the liquid along said path to effect said circulation in response to the air streams contacting the surface of the liquid, and means defining a passage for exhausting the air from said chamber.

2. Apparatus as defined in claim 1 including an air supply conduit within said cover member, and a plurality of said air nozzles extend downwardly from said air supply conduit into the air space within said chamber.

3. Apparatus as defined in claim 1 including at least one baffle member projecting downwardly from said cover member into said chamber, and said baffle member has a lower edge surface terminating substantially adjacent the surface of the liquid within said chamber.

4. In apparatus for treating a liquid containing organic solid material, comprising a tank having side and bottom walls defining a treating chamber, a removable cover member mounted on said tank for enclosing said chamber, inlet means for directing the liquid into said chamber, and outlet means for limiting the liquid within said chamber at a level below said cover member to define an air space within said chamber between said cover member and the surface of the liquid, the improvement comprising a plurality of air nozzles supported by said cover member and positioned above the surface of the liquid, means defining an air supply passage within said cover member for supplying air to said nozzles for producing corresponding streams of air from said nozzles against the surface of the liquid to cause surface diffusion of the air into the liquid and aerobic digestion of the organic solid material within the liquid, each of said nozzles being positioned on an incline relative to said cover member and the surface of the liquid, means for producing slow and continuous horizontal circulation of the liquid within said chamber in a generally circular path and including an arrangement of said nozzles spaced along said path and inclined in the same direction relative to the circulation of the liquid along said path to effect said circulation in response to the air streams contacting the surface of the liquid, and means defining an air exhaust passage within said cover member for exhausting the air from said chamber.

* * * * *